(12) United States Patent
Funabashi et al.

(10) Patent No.: US 8,415,922 B2
(45) Date of Patent: Apr. 9, 2013

(54) POWER TOOL

(75) Inventors: Kazuhiko Funabashi, Ibaraki (JP); Toshiaki Uchida, Ibaraki (JP); Toshihide Sasaki, Ibaraki (JP); Eiji Nakayama, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 12/515,409

(22) PCT Filed: Jan. 18, 2008

(86) PCT No.: PCT/JP2008/051021
§ 371 (c)(1),
(2), (4) Date: May 18, 2009

(87) PCT Pub. No.: WO2008/088087
PCT Pub. Date: Jul. 24, 2008

(65) Prior Publication Data
US 2010/0033134 A1    Feb. 11, 2010

(30) Foreign Application Priority Data
Jan. 18, 2007  (JP) ................................. 2007-008743

(51) Int. Cl.
*H02J 7/00*    (2006.01)
(52) U.S. Cl.
USPC .............. 320/114; 320/134; 320/136; 361/23
(58) Field of Classification Search .................. 320/114, 320/112, 127–136
See application file for complete search history.

(56) References Cited

U.S. PATENT DOCUMENTS

| | | | |
|---|---|---|---|
| 4,703,247 A | 10/1987 | Morioka | |
| 5,801,514 A | 9/1998 | Saeki | |
| 6,249,106 B1 * | 6/2001 | Turner et al. | 320/136 |
| 6,992,463 B2 * | 1/2006 | Yoshio | 320/134 |
| 7,521,892 B2 * | 4/2009 | Funabashi et al. | 320/114 |
| 7,619,391 B2 * | 11/2009 | Loong | 320/134 |
| 7,649,337 B2 * | 1/2010 | Uehlein-Proctor et al. | 320/112 |

FOREIGN PATENT DOCUMENTS

| | | | |
|---|---|---|---|
| EP | 0300537 A | | 1/1989 |
| EP | 0712007 A | | 5/1996 |
| JP | 6-245397 A | | 9/1994 |
| JP | 2000-280118 A | | 10/2000 |
| JP | 3222951 P | | 8/2001 |
| JP | 2006-116684 A | | 5/2006 |
| JP | 2006-122463 | * | 5/2006 |
| JP | 2006-122463 A | | 5/2006 |

(Continued)

OTHER PUBLICATIONS

Japanese Office Action for related Japanese Patent Application No. 2007-008743 dated Sep. 8, 2011.

*Primary Examiner* — Patrick Assouad
*Assistant Examiner* — Alesa Allgood
(74) *Attorney, Agent, or Firm* — Kenealy Vaidya LLP

(57) ABSTRACT

To provide a power tool which can supply electric power again from a battery even in a case where the supply of electric power from the battery is stopped by an over-discharge detection means. A power tool 1 includes an FET driving circuit 36 which permits the supply of electric power again to a motor 31 from a battery pack 2 in response to the turning-on of a trigger switch 33 even in the case where the battery pack 2 is placed in an over-discharge state and so the supply of electric power to the motor 31 from the battery pack 2 is stopped.

24 Claims, 6 Drawing Sheets

FOREIGN PATENT DOCUMENTS

| | | | |
|---|---|---|---|
| JP | 2006-281405 | * | 10/2006 |
| JP | 2006-281405 A | | 10/2006 |
| TW | I269705 B | | 1/2007 |
| WO | 2005/038952 A | | 4/2005 |

* cited by examiner

POWER TOOL

TECHNICAL FIELD

The present invention relates to a power tool having an over-discharge detection means.

BACKGROUND ART

Conventionally, a power tool employs a lithium battery which can supply a large current. However, when the lithium battery is continued to be used in an over-discharge state, the life time of the battery becomes short and there arises a risk that the battery catches fire. Thus, the power tool of the related art is provided with an over-discharge detection means for stopping the supply of electric power to a motor from the lithium battery so that the lithium battery is placed in the over-discharge state (see Japanese Patent No. 3222951, for example).

DISCLOSURE OF INVENTION

However, in the case where the power tool is a complete thread cutter, for example, if the supply of electric power to the motor from the lithium battery is interrupted on the way of the cutting process of a complete thread which is a member to be processed, the complete thread cutter can not be detached from the complete thread.

Accordingly, an object of the invention is to provide a power tool which can supply electric power again from a battery in accordance with an instruction from a user even in a case where the supply of electric power from the battery is stopped by an over-discharge detection means.

A power tool according to the invention includes:

a tool main body having a motor;

a battery pack which supplies electric power to the motor;

detection means which detects a battery voltage of the battery pack;

protection means which stops supply of the electric power to the motor from the battery pack when the battery voltage detected by the detection means is a predetermined value or less; and permission means which permits the supply of the electric power again to the motor from the battery pack in accordance with an instruction from a user even when the protection means stops the supply of the electric power to the motor from the battery pack.

According to such a configuration, for example, in the case where the power tool is a complete thread cutter, even if the supply of electric power to the motor from the battery pack is interrupted by the protection means on the way of the cutting process of a complete thread, since the permission means permits the supply of the electric power again to the motor from the battery pack in accordance with an instruction from a user, the power tool as the complete thread cutter can be detached from the complete thread.

Further, preferably, the permission means releases the stop of the supply of the electric power to the motor from the battery pack performed by the protection means, in accordance with the instruction from a user.

According to such a configuration, the permission means can permit again the supply of the electric power to the motor from the battery pack in response to such a simple operation of releasing the stop of the supply of the electric power to the motor from the battery pack performed by the protection means.

Further, the protection means may include:

switching means which is disposed between the motor and the battery pack and is capable of being turned on and off; and control means which turns the switching means off when the battery voltage detected by the detection means is the predetermined value or less.

According to such a configuration, the protection means can be realized with a simple configuration.

Further, the permission means may by-pass the switching means thereby to permit again the supply of the electric power to the motor from the battery pack.

According to such a configuration, the permission means can be realized with a simple configuration.

Further, preferably the switching means is an FET.

According to such a configuration, the switching means can be realized with a simple configuration.

Further, preferably, there is further provided with a change-over switch which changes a rotation direction of the motor, wherein the permission means permits the supply of the electric power again to the motor from the battery pack when the change-over switch selects one of rotation directions.

According to such a configuration, for example, in the case where the power tool is a complete thread cutter, the permission means permits the supply of the electric power again only when the one of the rotation directions is selected by the change-over switch like such a case of removing a complete thread from the complete thread cutter. Thus, the battery pack which is stopped from supplying electric power to the motor so as not to be in the over-discharge state can be prevented from supplying electric power in a case other than the necessary usage. Thus, such phenomena can be prevented from occurring that the battery pack catches fire or the life time of the battery pack becomes short.

Further, preferably, the permission means permits the supply of the electric power again to the motor from the battery pack when there is the instruction from a user within a predetermined time period after the protection means stops the supply of the electric power to the motor from the battery pack.

According to such a configuration, the battery pack which is stopped from supplying electric power to the motor so as not to be in the over-discharge state can be prevented from erroneously supplying electric power in a case other than the necessary case.

Further, the permission means may permit the supply of the electric power again to the motor from the battery pack when there is the instruction from a user until the motor rotates by a predetermined number of revolution after the protection means stops the supply of the electric power to the motor from the battery pack.

According to such a configuration, the battery pack which is stopped from supplying electric power to the motor so as not to be in the over-discharge state can be prevented from erroneously supplying electric power in a case other than the necessary case.

Further, preferably, the protection means stops again the supply of the electric power to the motor from the battery pack upon lapse of a predetermined time after the permission means permits the supply of the electric power again to the motor from the battery pack in accordance with the instruction from a user.

According to such a configuration, the battery pack which is stopped from supplying electric power to the motor so as not to be in the over-discharge state can be prevented from supplying electric power in a case other than the necessary case. Thus, such phenomena can be prevented from occurring that the battery pack catches fire or the life time of the battery pack becomes short.

Further, the protection means may stop again the supply of the electric power to the motor from the battery pack when the motor rotates by a predetermined number of revolution after the permission means permits the supply of the electric power again to the motor from the battery pack in accordance with the instruction from a user.

According to such a configuration, the battery pack which is stopped from supplying electric power to the motor so as not to be in the over-discharge state can be prevented from supplying electric power in a case other than the necessary case. Thus, such phenomena can be prevented from occurring that the battery pack catches fire or the life time of the battery pack becomes short.

Further, preferably, the battery pack includes a lithium battery.

According to such a configuration, the aforesaid effects are further enhanced since the lithium battery likely catches fire when used in the over-discharge state.

Further, the protection means may be provided on the battery pack side.

According to such a configuration, the size of the tool main body can be miniaturized.

Further, preferably, the detection means is provided on the battery pack side.

According to such a configuration, the size of the tool main body can be miniaturized.

Further, preferably, there is further provided with a conversion mean which converts a rotation driving force of the motor into a shearing force.

According to such a configuration, the power tool can be applied to a tool requiring a shearing force.

Further, preferably, the conversion mean rotates a tip end tool attached to the tool main body.

According to such a configuration, the power tool can be applied to a complete thread cutter, for example.

Further, the conversion mean may linearly move reciprocally a tip end tool attached to the tool main body.

According to such a configuration, the power tool can be applied to a curtain rail cutter, for example.

Further, there may be provided with a deceleration mechanism which decelerates a rotation speed of the motor and transmits the decelerated rotation to a tip end tool attached to the tool main body.

According to such a configuration, the power tool can be applied to a drill, for example.

According to the power tool of the invention, even in the case where the supply of electric power to the motor from the battery pack is stopped by the over-discharge detection means, electric power can be supplied again to the motor from the battery pack in accordance with an instruction from a user.

BEST MODE OF CARRYING OUT OF THE INVENTION

Hereinafter, the embodiment of the invention will be explained with reference to accompanied embodiment.

Figure 1:
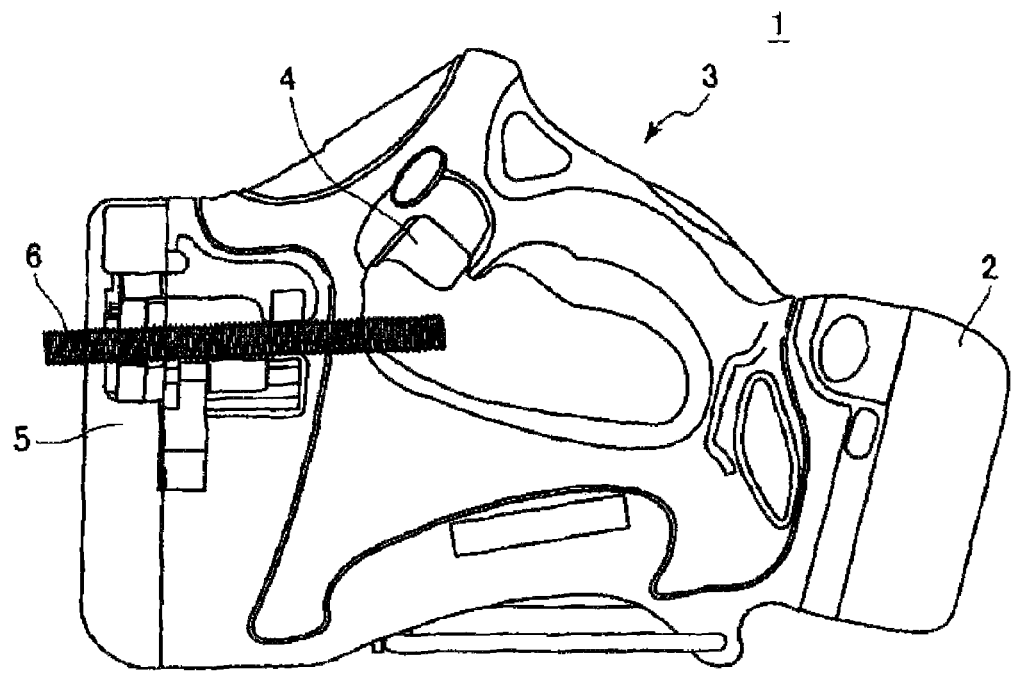
FIG. 1 is an outline view of a power tool 1 according to the embodiment.

FIG. 1 is an outline view of a power tool 1 according to the embodiment. In this embodiment, the power tool 1 is a complete thread cutter and includes a battery pack 2 and a tool main body 3. The tool main body 3 includes a trigger 4 and a cutter portion 5. When a user turns the trigger 4 on, the cutter portion 5 operates to cut a complete thread 6.

Figure 2:
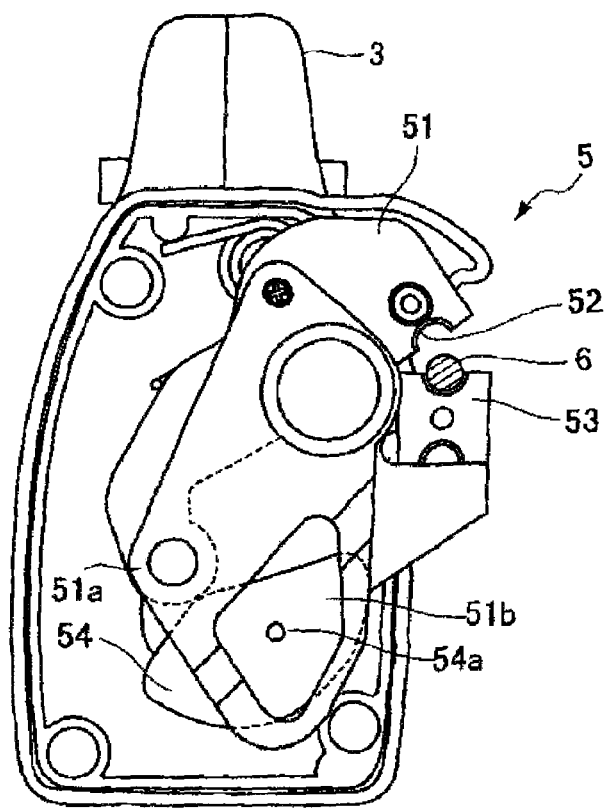
FIG. 2 is a diagram for explaining a cutter portion 5.
Figure 6:
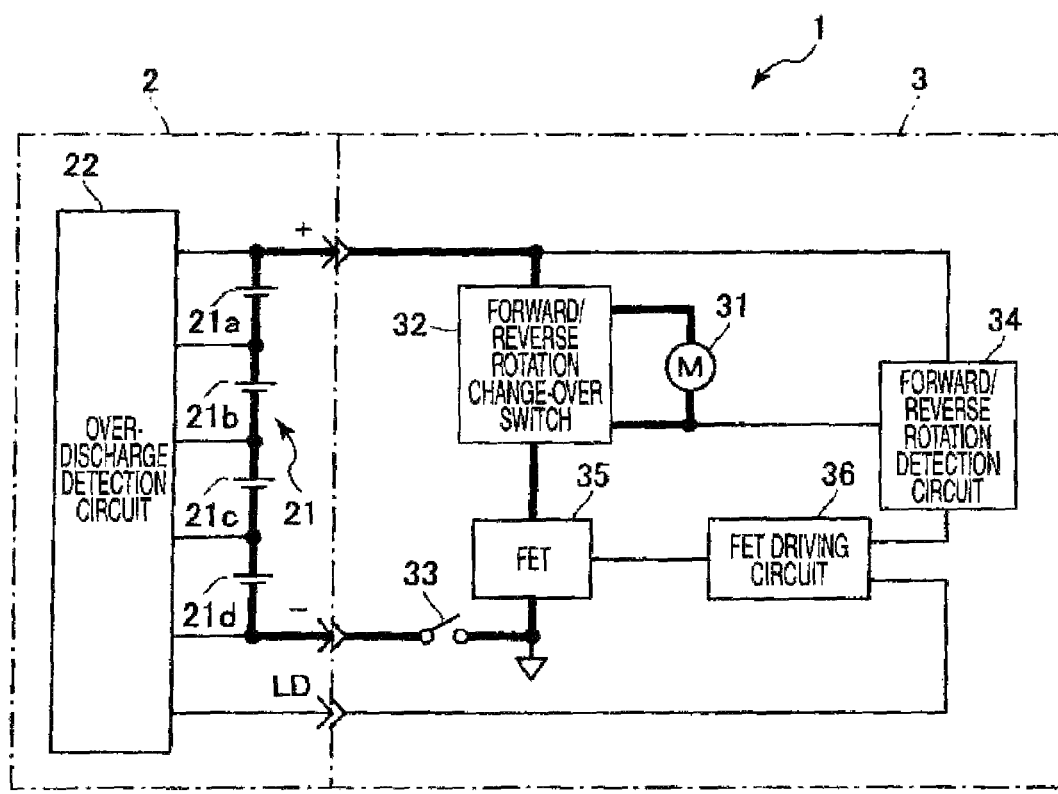
FIG. 6 is a block diagram showing a circuit configuration of the power tool 1.

FIG. 2 is a diagram for explaining the cutter portion 5. The cutter portion 5 includes a swingable member 51, a movable cutting blade 52, a fixed cutting blade 53 and a cum 54. The cam 54 is rotated by a driving force transmitted from a motor 31 (FIG. 6). The cam 54 has a pin 54a extending in the axial direction at a position separated from the rotation shaft. The swingable member 51 has a roller 51a and a return hole 51b. The roller 51a is able to contact with the cam 54. The swingable member 51 rotates in accordance with the contact between the cam 54 and the roller 51a. The return hole 51b is configured to dispose the pin 51a therein. The movable cutting blade 52 is attached to the tip end of the swingable member 51 and rotates in accordance with the rotation of the swingable member 51. The fixed cutting blade 53 is disposed at a position capable of cutting the complete thread 6 in cooperation with the movable cutting blade 52 in a rotating state.

Figure 3:
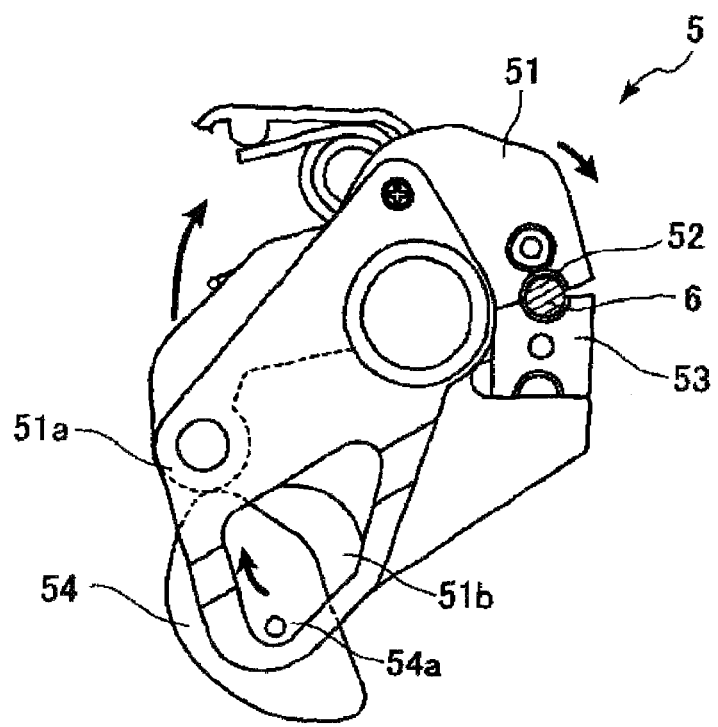
FIG. 3 is a diagram for explaining the cutter portion 5.
Figure 4:
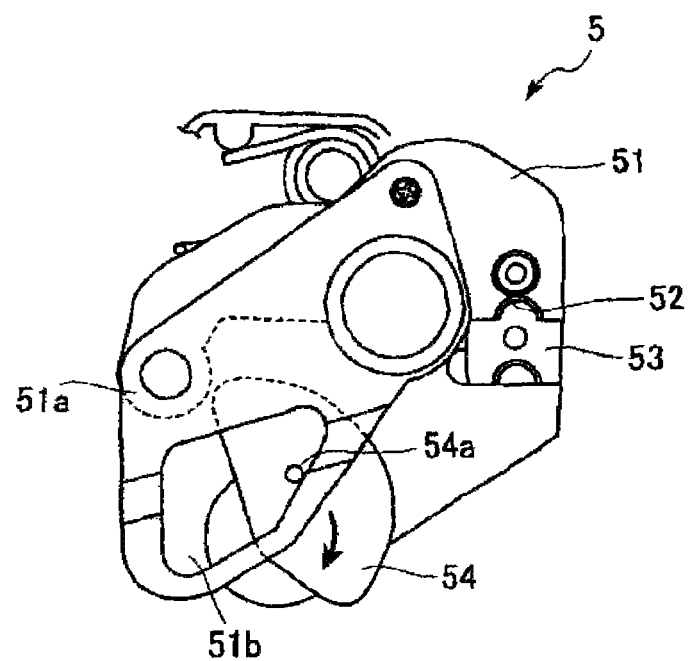
FIG. 4 is a diagram for explaining the cutter portion 5.

Next, the explanation will be made as to the cutting operation of the complete thread 6 performed by the cutter portion 5 with reference to FIGS. 2 to 5. First, as shown in FIG. 2, the complete thread 6 is disposed on the fixed cutting blade 53 in a state that there is a space between the movable cutting blade 52 and the fixed cutting blade 53. In this state, when a user turns the trigger 4 on, the driving force of the motor 31 (FIG. 6) is transmitted to the roller 51a (the swingable member 51) via the cam 54. Thus, each of the swingable member 51 and the movable cutting blade 52 rotates clockwise as shown in FIG. 3, and the movable cutting blade 52 and the fixed cutting blade 53 cut the complete thread 6 in a cooperation manner as shown in FIG. 4. In this state, since the pin 54a does not contact with the inner wall of the return hole 51b, the pin 54a does not interfere the rotation of the swingable member 51.

When the complete thread 6 is cut completely, as shown in FIG. 4, since the contact state between the cam 54 and the roller 51a is released, the driving force for rotating clockwise is not transmitted to the swingable member 51. When the swingable member 51 continues to rotate in this state, the pin 54a contacts with the inner wall of the return hole 51b. Thus, since the driving force for rotating in the reverse direction that is, counterclockwise is transmitted to the swingable member 51, each of the swingable member 51 and the movable cutting blade 52 rotates counterclockwise. Thus, another complete thread 6 can be disposed on the fixed cutting blade 53 again.

FIG. 6 is a block diagram showing the circuit configuration of the power tool 1. The battery pack 2 includes a battery set 21 having four lithium battery cells 21a to 21d and an over-discharge detection circuit 22. The tool main body 3 includes a forward/reverse rotation change-over switch 32, a trigger switch 33, a forward/reverse rotation detection circuit 34, an FET 35 and an FET driving circuit 36. The FET 35 and the FET driving circuit 36 correspond to a protection means of the invention and the FET driving circuit 36 corresponds to a permission means of the invention.

The lithium battery cells 21a to 21d supply electric power to the tool main body 3 side and each of the cells supplies 3.6 volt at the maximum. The over-discharge detection circuit 22 monitors the voltage of each of the lithium battery cells 21a to 21d. When the over-discharge detection circuit detects that the output voltage of at least one of the lithium battery cells 21a to 21d is 2 volt or less, the over-discharge detection circuit outputs a detection signal to the tool main body 3 side from an LD terminal of the battery pack 2 in order to prevent that the battery set 21 is placed in the over-discharge state. (Hereinafter, for the sake of convenience, the state where the battery cell 21 having the output voltage of 2 volt or less is detected is referred to an over-discharge state, and the detection signal outputted from the over-discharge detection circuit 22 at this time is referred to an over-discharge detection signal.)

The motor 31 is configured to rotate by electric power supplied from the battery set 21. The forward/reverse rotation change-over switch 32 is a switch for changing over the rotation direction of the movable cutting blade 52. When the forward/reverse rotation change-over switch 32 is turned to the "forward rotation" side, the motor 31 rotates in the forward direction and so the movable cutting blade 52 rotates in the forward direction (clockwise in FIGS. 2 to 5). In contrast, when the forward/reverse rotation change-over switch 32 is turned to the "reverse rotation" side, the motor 31 rotates in the reverse direction and so the movable cutting blade 52 rotates in the reverse direction (counterclockwise in FIGS. 2 to 5).

Figure 5:
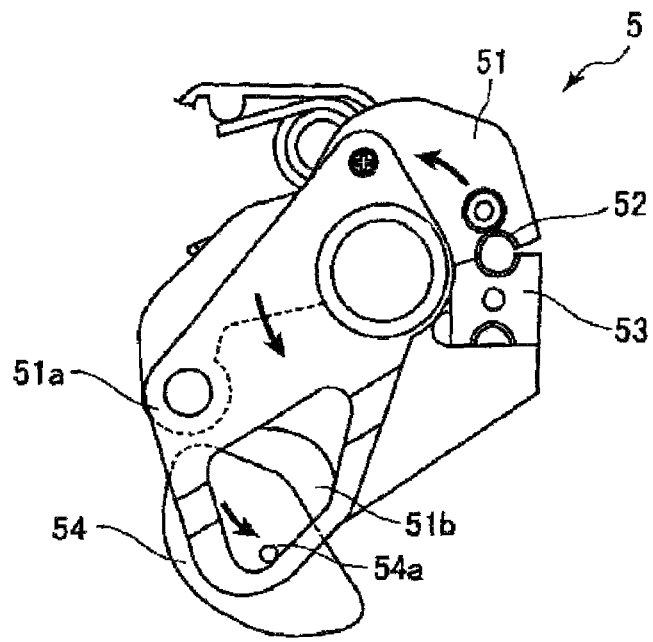
FIG. 5 is a diagram for explaining the cutter portion 5.

For example, in the case of stopping the cutting operation on the way of the cutting operation due to the biting into the complete thread 6 etc., the forward/reverse rotation change-over switch 32 is turned to the "reverse rotation" side to separate the movable cutting blade 52 from the fixed cutting blade 53. In this case, as shown in FIG. 5, since both the cam 54 and the pin 54a rotate counterclockwise, the pin 54a contacts with the inner wall of the return hole 51b. Thus, the movable cutting blade 52 swings counterclockwise and so the movable cutting blade 52 separates from the fixed cutting blade 53. According to the embodiment, the motor 31 is arranged to rotate reversely when the forward/reverse rotation change-over switch 32 is turned to the "reverse rotation" side. However, the invention may be configured in a manner that although the motor 31 continues to rotate in the forward direction despite of the changing-over of the forward/reverse rotation change-over switch, there may be provided with, for example, a gear portion which performs engaging/disengaging operations in association with the changing-over of the forward/reverse rotation change-over switch 32 to the "forward rotation" side and the "reverse rotation" side thereby to forwardly and reversely rotate the cam 54.

The trigger switch 33 is coupled between the motor 31 and the battery set 21. The trigger switch 33 is also turned on when the trigger 4 is turned on. The forward/reverse rotation detection circuit 34 outputs a forward/reverse rotation detection signal in accordance with whether the forward/reverse rotation change-over switch 32 is turned to the "forward rotation" side or the "reverse rotation" side. To be concrete, the forward/reverse rotation detection circuit outputs a forward rotation detection signal when the forward/reverse rotation change-over switch 32 is turned to the "forward rotation" side and outputs a reverse rotation detection signal when the forward/reverse rotation change-over switch 32 is turned to the "reverse rotation" side. The FET 35 is turned on and off in accordance with a signal from the FET driving circuit 36.

The FET driving circuit 36 is an analog circuit which outputs an on signal and an off signal to the FET 35 based on the over-discharge detection signal from the over-discharge detection circuit 22 and the forward/reverse rotation detection signal from the forward/reverse rotation detection circuit 34. To be concrete, when the over-discharge detection signal is not supplied from the over-discharge detection circuit 22, the FET driving circuit supplies the on signal to the FET 35 irrespective of the forward/reverse rotation detection signal from the forward/reverse rotation detection circuit 34 thereby to turn the FET on. On the other hand, when the over-discharge detection signal is supplied from the over-discharge detection circuit 22, the FET driving circuit supplies the off signal to the FET 35 irrespective of the forward/reverse rotation detection signal from the forward/reverse rotation detection circuit 34 thereby to turn the FET off temporarily.

Further, even when the over-discharge detection signal is supplied from the over-discharge detection circuit 22 thereby to turn the FET off, the FET driving circuit 36 outputs the on signal to the FET 35 thereby to turn the FET 35 on again when the reverse rotation detection signal is supplied from the forward/reverse rotation detection circuit 34. In a case other than the aforesaid case, the FET driving circuit 36 output the off signal to the FET 35 thereby to turn the FET 35 off.

In the case where each of the lithium battery cells 21a to 21d outputs the voltage larger than 2 volt, since the FET 35 is turned on, electric power is supplied to the motor 31 from the battery set 21 in accordance with the turning-on of the trigger switch 33. On the other hand, when one of the lithium battery cells 21a to 21d is in the over-discharge state, since the FET 35 is turned off, electric power is not supplied to the motor 31 from the battery set 21 even if the trigger switch 33 is turned on.

However, in the power tool 1 according to the embodiment, even in the case where one of the lithium battery cells 21a to 21d is in the over-discharge state and so electric power supplied to the motor 31 from the battery set 21 is interrupted, when the forward/reverse rotation change-over switch 32 is turned to the "reverse rotation" side, the FET 35 is turned on again and so electric power can be supplied again to the motor 31 from the battery set 21.

Figure 7:
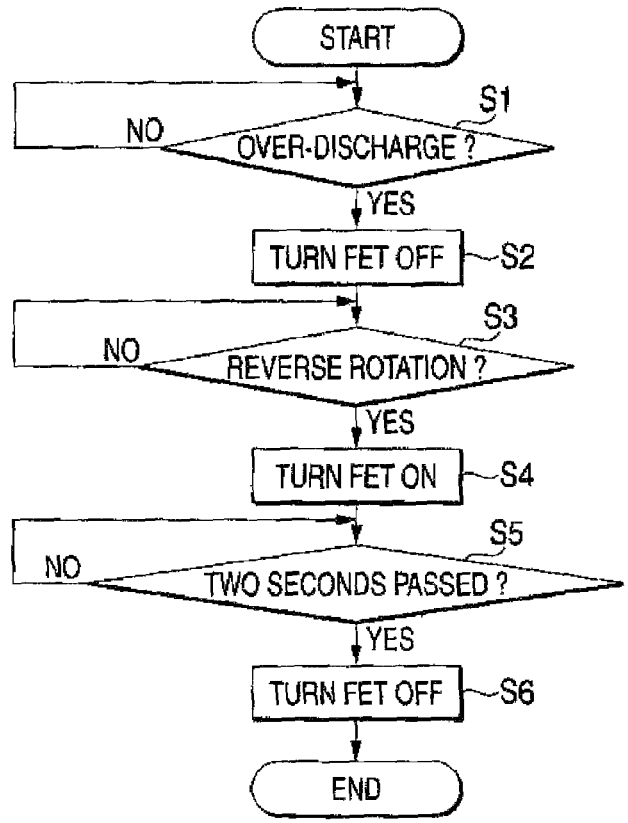
FIG. 7 is a flowchart of the control operation of an FET 35 performed by an FET driving circuit 36.

The explanation will be made as to the control operation of the FET 35 performed by the FET driving circuit 36 with reference to a flowchart of FIG. 7. The flowchart starts from a state where each of the lithium battery cells 21a to 21d outputs the voltage larger than 2 volt and the trigger switch 33 is in the turned-on state. Firstly, it is determined whether or not the over-discharge detection signal is supplied from the over-discharge detection circuit 22 (step S1). In the case where the over-discharge detection signal is not supplied (No in step S1), it is determined again whether or not the over-discharge detection signal is supplied from the over-discharge detection circuit 22. On the other hand, when the over-discharge detection signal is supplied (Yes in step S1), the off signal is supplied to the FET 35 thereby to turn the FET 35 off (step S2). Thus, electric power supplied to the motor 31 from the battery set 21 is interrupted.

Succeedingly, it is determined whether or not the forward/reverse rotation change-over switch 32 is turned on the "reverse rotation" side based on the basis of the forward/reverse rotation detection signal from the forward/reverse rotation detection circuit 34 (step S3). When the forward rotation detection signal is supplied (No in step S3), it is determined again whether or not the forward/reverse rotation change-over switch 32 is turned on the "reverse rotation" side. In contrast, when the reverse rotation detection signal is supplied (Yes in step S3), the on signal is supplied to the FET 35 thereby to turn the FET 35 on (step S4). Then, it is determined whether or not two seconds passed after outputting the on signal to the FET 35 (step S5). When it is determined that two seconds has not passed yet. (No in step S5), it is determined again whether or not two seconds passed. In contrast, when it is determined that two seconds has passed (Yes in step S5), the off signal is supplied to the FET 35 thereby to turn the FET 35 off (step S6).

In this manner, according to the power tool 1 of the embodiment, even when the battery set 21 is placed in the over-discharge state and so the FET 35 is turned off, since the FET 35 can be turned on again, electric power can be supplied to the motor 31 again when a user turns the trigger 4 on. Thus, for example, even in the case where the battery set 21 is placed in the over-discharge state on the way of the cutting operation of the complete thread 6 and so electric power supplied to the motor 31 is interrupted, electric power is supplied to the motor 31 again and hence the power tool 1 as the complete thread cutter can be removed from the complete thread 6.

Further, according to the embodiment, the FET 35 can be turned on only when the forward/reverse rotation change-over switch 32 is turned on the "reverse rotation" side. Thus, the battery set 21 in the over-discharge state supplies electric power again only for the usage of the reverse rotation of the movable cutting blade 52, that is, only for a predetermined usage such as the removal of the complete thread 6. Thus, the battery set 21 in the over-discharge state is prevented from supplying electric power in a case other than the necessary usage. Thus, such phenomena can be prevented from occurring that the lithium battery cells 21a to 21c catch tire or the life time of the lithium battery cells 21a to 21c becomes short.

Furthermore, according to the embodiment, the battery set 21 in the over-discharge state can supply electric power to the motor 31 again only for two seconds. According to this feature also, since the battery set 21 in the over-discharge state is prevented from supplying electric power in a case other than the necessary case, such phenomena can be prevented from occurring that the lithium battery cells 21a to 21c catch fire or the life time of the lithium battery cells 21a to 21c becomes short. Incidentally, the time period during which the battery set 21 in the over-discharge state can supply electric power again is not limited to two seconds.

The power tool according to the invention is not limited to the aforesaid embodiment and, of courser various modifications may be made within the range not departing from the gist of the invention.

Figure 8:
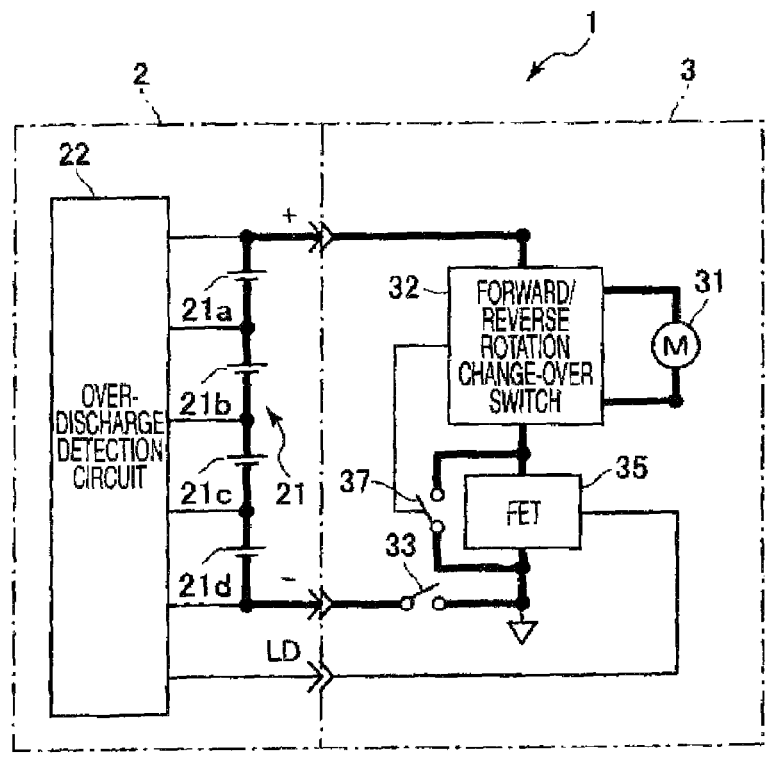
FIG. 8 is a modified example of the power tool 1 according to the embodiment.

For example, as shown in FIG. 8, there may be provided with a bypass switch 37 which is coupled in parallel to the FET 35 and is turned on when the forward/reverse rotation change-over switch 32 is turned to the "reverse rotation" side. According to such a configuration, even when the battery set 21 is placed in the over-discharge state and so the FET 35 is turned off, electric power can be supplied to the motor 31 from the battery set 21 when a user turns the trigger 4 on so long as the forward/reverse rotation change-over switch 32 is turned to the "reverse rotation" side. Further, since it is not necessary to provide the forward/reverse rotation detection circuit 34 and the FET driving circuit 36, the circuit configuration can be simplified. Further, the circuit configuration can be also simplified since the circuit is configured by only analog elements.

Figure 9:
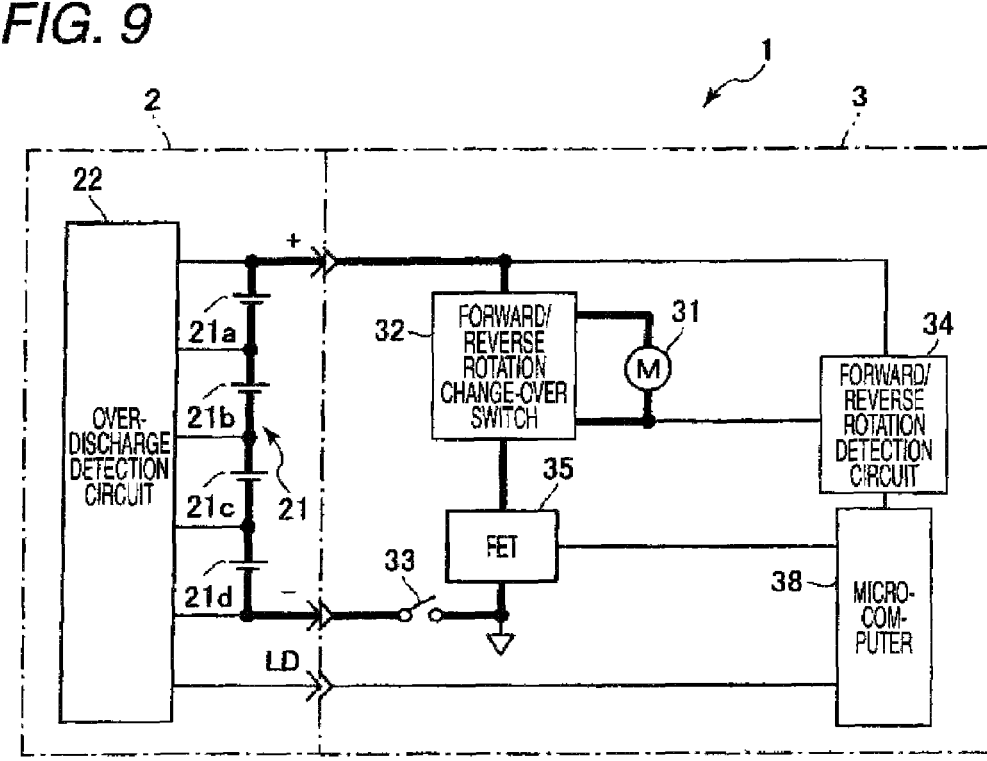
FIG. 9 is another modified example of the power tool 1 according to the embodiment.

Further, as shown in FIG. 9, a microcomputer 38 may be provided in place of the FET driving circuit 36 so that the FET 35 is turned on and off in accordance with the over-discharge signal from the over-discharge detection circuit 22 and the forward/reverse rotation detection signal from the forward/reverse rotation detection circuit 34.

Figure 10:
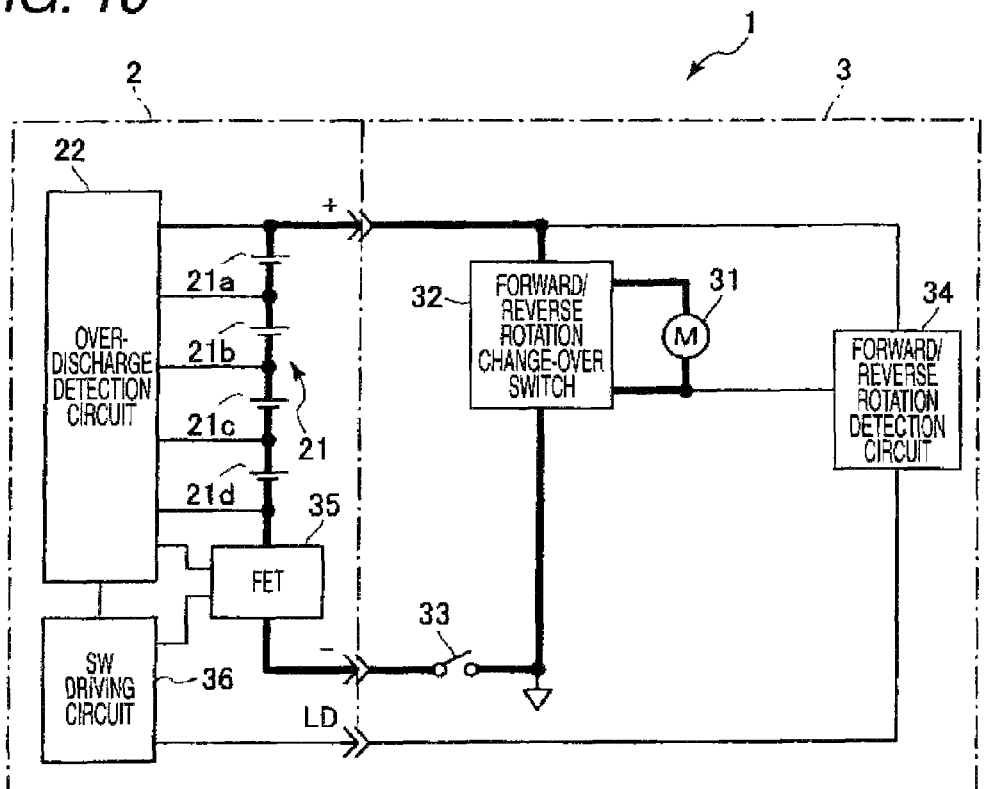
FIG. 10 is a still another modified example of the power tool 1 according to the embodiment.

Further, as shown in FIG. 10C, the FET 35 and the FET driving circuit 36 may be provided on the battery pack 2 side. In this case, the LD terminal of the battery pack 2 is used for supplying the forward/reverse rotation detection signal from the forward/reverse rotation detection circuit 34 to the battery pack 2 side. According to such a configuration, the size of the tool main body 3 can be miniaturized.

Furthermore, the invention may be arranged in a manner that after the lapse of a predetermined time after the battery set 21 is placed in the over-discharge state and so the FET 35 is turned off, the FET 35 can not be turned on even if the forward/reverse rotation change-over switch 32 is turned to the "reverse rotation" side. In this case, for example, the microcomputer 38 in FIG. 9 monitors the on/off state of the FET 35 and the changing-over of the forward/reverse rotation change-over switch 32, and outputs a turning-on signal to the FET 35 only when it is determined that the forward/reverse rotation change-over switch 32 is turned to the "reverse rotation" side before the predetermined time lapses after the battery set 21 is placed in the over-discharge state and so the FET 35 is turned off. Usually, the battery set 21 in the over-discharge state is required to be used only in a particular usage such as the removal of the complete thread 6 from the power tool 1 serving as the complete thread cutter. In such a case, the battery set is usually used immediately after the FET 35 is turned off. In this manner, since the supply of electric power from the battery set 21 is permitted again only during the predetermined time after the turning-off of the FET 35, the battery set 21 in the over-discharge state can be prevented from erroneously supplying electric power in a case other than the necessary case.

Furthermore, although in the aforesaid embodiment, the time period during which the battery set 21 in the over-discharge state can supply electric power again is determined by a time lapse, the time period may be determined by the revolution number of the motor 31. In this case, the time lapse may be determined by the predetermined revolution number in place of the predetermined time lapse in step S5 of the flowchart of FIG. 7. Further, the time period may be determined by both the time lapse and the revolution number.

The aforesaid configuration may be applied to other tools other than the complete thread cutter. For example, as shown in FIG. 11, the aforesaid configuration may be applied to a driver or a curtain rail cutter for cutting a curtain rail.

Figure 11:
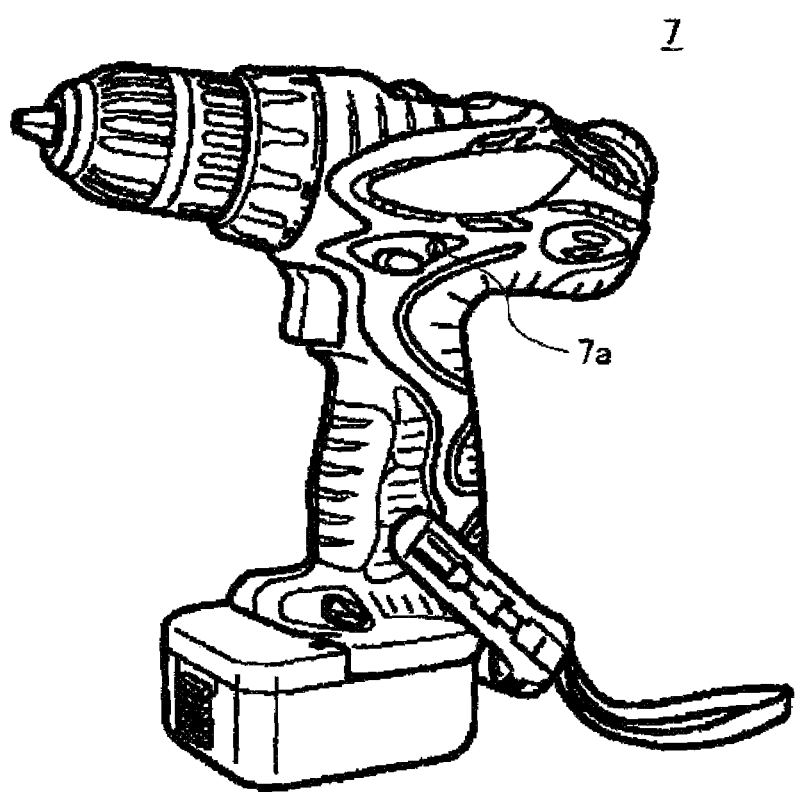
FIG. 11 is a still another modified example of the power tool 1 according to the embodiment.

Further, as shown in FIG. 11, the invention may be configured in a manner that there is provided with a permission switch 7a for permitting the supply of electric power again to the motor 31 from the battery pack 2, and so even in the case where the supply of electric power to the motor 31 from the battery pack 2 is stopped by the circuit 6, the supply of electric power to the motor 31 from the battery pack 2 is permitted again when a user pushes the permission switch 7a. Although a power tool 7 shown in FIG. 11 is a perforation tool, the tool can attain the following function and effects. That is, even in the case where the battery pack 2 is placed in the over-discharge state, a tip end tool can be easily pulled cut from a partner member by starting the motor 31 while pushing the permission switch 7a.

Furthermore, according to the embodiment, although the lithium battery is used as a battery, another secondary battery such as a nickel-cadmium battery may be used when it is required to detect the over-discharge state.

Furthermore, although in the aforesaid embodiment, the FET 35 is turned on only when the forward/reverse rotation change-over switch 32 is turned to the "reverse rotation" side, the FET 35 may be turned on again merely in response to the turning-on of the trigger switch 33 irrespective of the turning state of the forward/reverse rotation change-over switch 32.

The "forward rotation" and the "reverse rotation" in the embodiment means the rotation direction of a tip end tool attached to the tip end of the power tool 1.

The invention claimed is:

1. A power tool, comprising:
   a tool main body having a motor configured to rotate in a first direction and a second direction;
   a battery pack which supplies electric power to the motor;
   detection means which detects a battery voltage of the battery pack;
   protection means which stops supply of the electric power to the motor from the battery pack when the motor is rotating in the first direction and the battery voltage detected by the detection means is a predetermined value or less;
   determining means which determines whether an instruction from a user is to rotate the motor in the first direction or the second direction after the stop of the supply of the electric power to the motor by the protection means; and
   permission means which maintains the stop of the supply of the electric power to the motor when it is determined that the instruction from the user is to rotate the motor in the first direction and permits the supply of the electric power again to the motor when it is determined that the instruction from the user is to rotate the motor in the second direction.

2. The power tool according to claim 1, further comprising:
   a changeover switch which changes a rotation direction of the motor, wherein
   the permission means permits the supply of the electric power again to the motor from the battery pack when the charge-over switch selects one of rotation directions.

3. The power tool according to claim 1, wherein the permission means permits the supply of the electric power again to the motor from the battery pack when there is the instruction from a user within a predetermined time period after the protection means stops the supply of the electric power to the motor from the battery pack.

4. The power tool according to claim 1, wherein the permission means permits the supply of the electric power again to the motor from the battery pack when there is the instruction from a user until the motor rotates by a predetermined number of revolution after the protection means stops the supply of the electric power to the motor from the battery pack.

5. The power tool according to claim 1, wherein the protection means stops again the supply of the electric power to the motor from the battery pack upon lapse of a predetermined time after the permission means permits the supply of the electric power again to the motor from the battery pack in accordance with the instruction from a user.

6. The power tool according to claim 1, wherein the protection means stops again the supply of the electric power to the motor from the battery pack when the motor rotates by a predetermined number of revolution after the permission means permits the supply of the electric power again to the motor from the battery pack in accordance with the instruction from a user.

7. The power tool according to claim 1, wherein the battery pack includes a lithium battery.

8. The power tool according to claim 1, wherein the protection means is provided on the battery pack side.

9. The power tool according to claim 1, wherein the detection means is provided on the battery pack side.

10. The power tool according to claim 1, further comprising a deceleration mechanism which decelerates a rotation speed of the motor and transmits the decelerated rotation to a tip end tool attached to the tool main body.

11. The power tool according to claim 1, wherein the protection means includes:
    switching means which is disposed between the motor and the battery pack and is capable of being turned on and off; and control means which turns the switching means off when the battery voltage detected by the detection means is the predetermined value or less.

12. The power tool according to claim 11, wherein the permission means by-passes the switching means thereby to permit again the supply of the electric power to the motor from the battery pack.

13. The power tool according to claim 11, wherein the switching means is an FET.

14. The power tool according to claim 1, further comprising conversion mean which converts a rotation driving force of the motor into a shearing force.

15. The power tool according to claim 14, wherein the conversion mean rotates a tip end tool attached to the tool main body.

16. The power tool according to claim 14, wherein the conversion mean linearly moves reciprocally a tip end tool attached to the tool main body.

17. A battery pack for supplying electric power to a motor included in a tool main body of a power tool, the motor configured to rotate in a first direction and a second direction, the battery pack comprising:
    detection means which detects a battery voltage of the battery pack; and
    protection means which stops supply of the electric power to the motor from the battery pack when the motor is rotating in the first direction and the battery voltage detected by the detection means is a predetermined value or less;
    and the power tool comprising:
    determining means which determines whether an instruction from a user is to rotate the motor in the first direction or the second direction after the stop of the supply of the electric power to the motor by the protection means; and
    permission means which maintains the stop of the supply of the electric power to the motor when it is determined that the instruction from the user is to rotate the motor in the first direction and permits the supply of the electric power again to the motor when it is determined that the instruction from the user is to rotate the motor in the second direction.

18. The battery pack according to claim 17, wherein the release of the stop of the supply of the electric power to the motor from the battery pack is performed by the protection means, in accordance with the instruction from a user.

19. The battery pack according to claim 17, wherein the protection means stops again the supply of the electric power to the motor from the battery pack upon lapse of a predetermined time after the supply of the electric power is permitted again to the motor from the battery pack in accordance with the instruction from a user.

20. The battery pack according to claim 17, wherein the protection means stops again the supply of the electric power to the motor from the battery pack when the motor rotates by a predetermined number of revolutions after the supply of the electric power is permitted again to the motor from the battery pack in accordance with the instruction from a user.

21. The battery pack according to claim 17, wherein the battery pack includes a lithium battery.

22. The battery pack according to claim 17, wherein the protection means includes:
switching means which is disposed between the motor and a battery included in the battery pack and is capable of being turned on and off; and
control means which turns the switching means off when the battery voltage detected by the detection means is the predetermined value or less.

23. The power tool according to claim 22, wherein the switching means is an FET.

24. A method for controlling a power tool having a tool body, a motor, and a battery pack which supplies electric power to a motor, and detection means which detects a battery voltage of the battery pack, the method comprising:
rotating the motor in a first direction;
stopping the supply of electric power to the motor when the motor is rotating in the first direction and the battery voltage detected by the detecting means is a predetermined value or less;
determining whether an instruction from a user is to rotate the motor in the first direction or the second direction after the stop of the supply of electric power to the motor; and
maintaining the stop of the supply of the electric power to the motor when the instruction form the user is to rotate the motor in the first direction and permitting the supply of the electric power again to the motor when the instruction from the user is to rotate the motor in the second direction.

* * * * *

UNITED STATES PATENT AND TRADEMARK OFFICE
CERTIFICATE OF CORRECTION

| | | |
|---|---|---|
| PATENT NO. | : 8,415,922 B2 | Page 1 of 1 |
| APPLICATION NO. | : 12/515409 | |
| DATED | : April 9, 2013 | |
| INVENTOR(S) | : Funabashi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 347 days.

Signed and Sealed this
Twenty-fourth Day of May, 2016

Michelle K. Lee
*Director of the United States Patent and Trademark Office*